M. AXILROD.
ADJUSTABLE BEARING SUPPORT.
APPLICATION FILED MAR. 24, 1917.
1,281,269.
Patented Oct. 15, 1918.
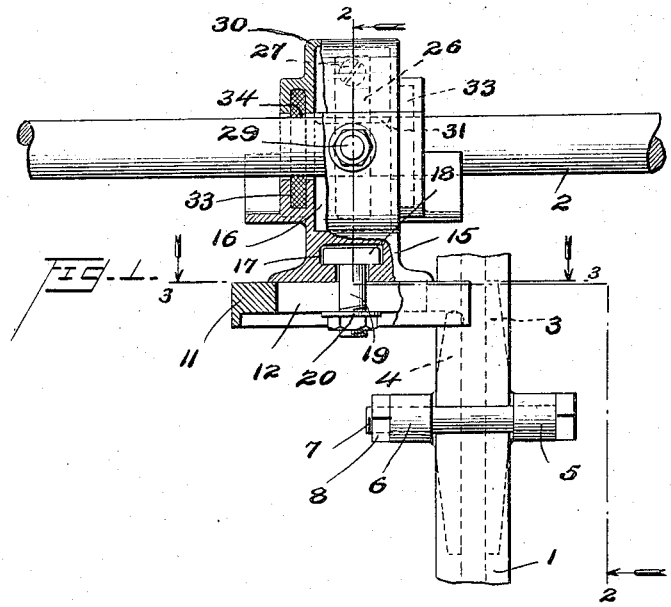

UNITED STATES PATENT OFFICE.

MEYER AXILROD, OF NEW YORK, N. Y., ASSIGNOR TO SAFETY MACHINERY CORPORATION, OF NEW YORK, N. Y., A CORPORATION OF NEW YORK.

ADJUSTABLE BEARING-SUPPORT.

1,281,269.
Specification of Letters Patent.
Patented Oct. 15, 1918.

Application filed March 24, 1917. Serial No. 157,065.

*To all whom it may concern:*

Be it known that I, MEYER AXILROD, a citizen of the United States, residing in the city and county of New York, State of New York, have invented certain new and useful Improvements in Adjustable Bearing-Supports, of which the following is a specification.

The object of my invention is to provide an improved construction of adjustable shaft supporting means, the construction of said means being such that the bearing for the shaft may be positioned readily in various positions as may be necessary to correspond to that in which the shaft may of necessity be placed.

My invention is especially well adapted for use in connection with a construction such as is described in the Letters Patent No. 1,188,385, issued to me June 27th, 1916, in which a single shaft is supported upon a plurality of bearings and is employed for driving a plurality of devices, such as sewing machines, shown in said patent.

When a number of bearings are employed for supporting a single shaft it is desirable that means be provided whereby such bearings may be readily brought into alinement and also whereby said bearings may, to an extent at least, automatically adjust themselves to the position of the shaft journaled therein. However, my invention is not limited to use in connection or in association with a plurality of bearings for supporting a shaft, but is adapted for use at any place and under such circumstances as bearings generally are used.

Other objects and advantages of my invention will be referred to in the detailed description thereof which follows or will be apparent from such description.

In order that my invention may be more readily and more easily understood and its practical advantages more fully appreciated reference should be had to the accompanying drawing in which I have illustrated one form of an embodiment thereof. It will be understood, however, that changes in the details of construction may be made within the scope of the claims without departing from my invention.

Referring to the drawing:

Figure 1 is a view in rear side elevation with parts of the construction broken away to show portions of the same in section;

Fig. 2 is a transverse sectional view taken on the line 2—2 of Fig. 1; and

Fig. 3 is a transverse sectional view taken on the line 3—3 of Figs. 1 and 2.

Referring to the drawings, 1 designates a portion of a leg for supporting a table or other like member on which devices such as sewing machines, not shown, are supported and which are operated by suitable connections from a shaft 2. In the construction shown the leg 1 consists of an I-beam, but such leg may be of any other shape or contour in transverse section.

3 and 4 designate clamping members situated upon opposite sides of the web of the I-beam 1. Each of these clamping members is provided at its center with cross arms 5 and 6 having holes in their outer ends as indicated, through which binding bolts 7 extend and by means of which the clamps 3 and 4 may be clamped firmly against the web of the I-beam 1. By loosening the nuts 8 upon the bolts to loosen the clamps 3 and 4 the latter may be adjusted to any position desired up or down upon the I-beam 1.

At its upper end the clamp 4 is provided with an angular arm 10, the inner or rear end of which is provided with an enlarged T-shaped portion 11 having a slot 12 therein, the said slot extending, in the construction shown, in a direction parallel with the shaft 2.

15 designates the base portion of a member provided with a receptacle or chamber 16 in its upper end portion, that is, in its upper side. The said base portion is provided with a T-shaped slot 17 which receives the T-shaped head 18 of a bolt 19 extending through the slot 12. The bolt is clamped and held in position by means of a nut and washer 20. The T-slot 17 is arranged and extends at right angles to the slot 12, as is shown in Figs. 1 and 2 of the drawings.

25 designates a roller bearing ring through which the shaft 2 extends and by which the said shaft is supported. The said ring is held in position by the clamping ring 26 provided with the clamping screw 27. The said clamping ring is pivotally supported by reason of engagement therewith of the pointed ends of the screw bolts 29 which are opposed to each other and which extend through screw threaded openings near the upper edge of the wall of the chamber 16.

The chamber 16 is adapted to receive and to hold a lubricant, such as oil, for lubricating the shaft bearing which is pivotally supported therein. Said chamber 16 is closed by means of a removable lid or cover 30 provided at opposite sides with overlapping lips 31 which extend downwardly upon the inside of the upper edge of the wall of the chamber 6 along the portions thereof on opposite sides of the shaft 2. The presence of these lips causes any oil which is splashed up on to the cover 30 to flow back into the chamber 16.

Upon opposite sides of the chamber 16 and the cover 30 therefor in the direction of the length of the shaft 2 I have provided relatively narrow chambers 33 for the reception of packing material, such as felt, having openings 34 extending therethrough which fit closely around the shaft 2, as is clearly shown in Fig. 2 of the drawing. The outline of one of these packing pieces or members is indicated by dotted lines in Fig. 2 of the drawing.

By my construction it will be seen that I have provided means whereby a bearing may be adjusted practically in every direction. Adjustment up and down may be effected by adjusting the supporting clamping members 3 and 4 up and down. Horizontal adjustment in a direction parallel with the length of the shaft may be effected by adjusting the T-headed bolt 19 in the slot 12. Horizontal adjustment in a direction at right angles to the last named adjustment may be effected by adjusting the member comprising the parts 15 and 16 with respect to the T-head 18 of the T-headed bolt. Also as has been previously suggested the roller bearing itself is automatically adjustable upon the pointed ends of the bolts 29.

In the setting up of shafting, particularly if the shaft be long or if it be flexible shafting, the ability or capacity of universal adjustment of the shaft bearings is a desideratum greatly to be desired. All of these advantages are present in a construction embodying my invention.

I claim:—

1. In combination, a bearing, means for adjusting the said bearing horizontally in directions substantially at right angles to each other and additional means for adjusting the said bearing vertically.

2. In combination, a bearing support, a horizontally extending member for supporting said bearing support, means whereby the said bearing support may be adjusted horizontally in directions extending transversely of each other and means whereby said member may be adjusted vertically.

3. In combination, clamping members, means for supporting said clamping member, an arm extending laterally from one of said clamping members, said arm having a slot provided therein, a bearing supporting member supported upon said arm, a T-slot in the said bearing supporting member and means extending into the said slots for securing the said bearing supporting member in position upon the said arm.

4. In combination, a bearing, a bearing supporting member, means for pivotally supporting the said bearing upon said member, means for supporting the said bearing supporting member and means whereby the said bearing supporting member may be adjusted in a plurality of directions.

5. In combination, a bearing supporting member comprising a chamber, a bearing situated in the said chamber, means for pivotally supporting the said bearing in said chamber, a covering for the said chamber said cover being provided with lips extending downwardly upon the inner sides of portions of the said chamber, the said chamber being provided with receptacles formed upon opposite sides thereof, packing means situated in the said receptacles extending around portions of a shaft supported in said bearing and means for adjusting the said chamber horizontally and vertically, substantially as described.

6. In combination, an upright supporting member, clamping members adapted to be adjustably secured to the said supporting member, one of the said clamping members being provided with a laterally extending arm having a slot therein, a bearing supporting member, a bearing pivotally connected with and supported upon the said bearing supporting member, said bearing supporting member being provided with a slot and means extending into the said slots for adjustably connecting the said bearing supporting member to the said arm, substantially as described.

In testimony that I claim the foregoing as my invention, I have hereunto signed my name this 19th day of March, A. D. 1917.

MEYER AXILROD.